United States Patent [19]

Creed

[11] 4,161,896
[45] Jul. 24, 1979

[54] THEFT PREVENTION ASSEMBLY FOR USE WITH CAR WHEELS

[75] Inventor: Clark E. Creed, Wethersfield, Conn.

[73] Assignee: Monarch Machine Company, Inc., New Britain, Conn.

[21] Appl. No.: 856,002

[22] Filed: Nov. 30, 1977

[51] Int. Cl.² ............... B25B 13/06; F16B 23/00
[52] U.S. Cl. ......................... 81/121 A; 81/125; 85/32 R; 85/45
[58] Field of Search ............ 81/90 R, 90 D, 120, 81/121 A, 125, 71; 85/32 R, 45; 70/229, 231; 145/50 D, 50 E, 52

[56] References Cited

U.S. PATENT DOCUMENTS

| | | | |
|---|---|---|---|
| 1,868,009 | 7/1932 | Gelinski | 145/50 D X |
| 1,958,981 | 5/1934 | Wilczek | 145/50 E |
| 1,992,474 | 2/1935 | Currier | 81/90 D X |
| 2,371,121 | 3/1945 | Basquin | 85/32 R |
| 2,756,791 | 7/1956 | Ferrara | 145/52 X |
| 3,351,111 | 11/1967 | Biddle | 145/52 |
| 4,018,111 | 4/1977 | Goldhaber | 81/71 |

*Primary Examiner*—Robert Louis Spruill
*Assistant Examiner*—James G. Smith
*Attorney, Agent, or Firm*—Prutzman, Kalb, Chilton & Alix

[57] ABSTRACT

A theft prevention assembly for use with car wheels and the like includes a threaded sleeve adapted to be threaded onto a wheel mounting stud in place of the usual lug nut, the sleeve having an enlarged head portion at its outer end which is loosely encircled by a ring. The ring and enlarged head portion having opposed surfaces preventing the ring from moving outwardly of the head portion. A special wrenching tool has clamping members between which the ring and outer end of the sleeve may be clamped to produce sufficient frictional force to cause the assembly to rotate as a unit when the wrench is turned.

4 Claims, 4 Drawing Figures

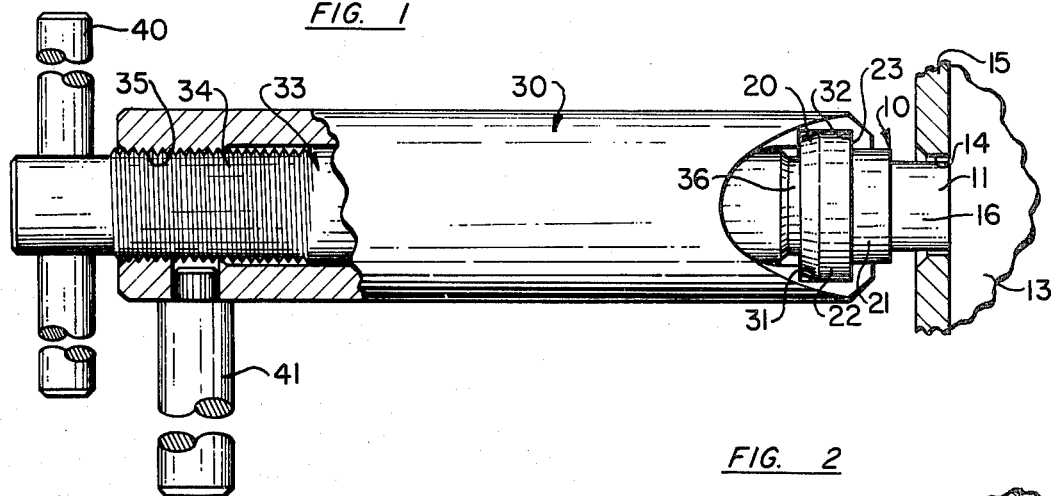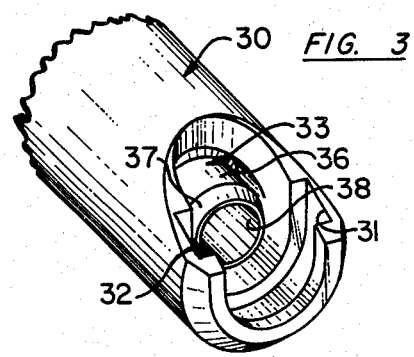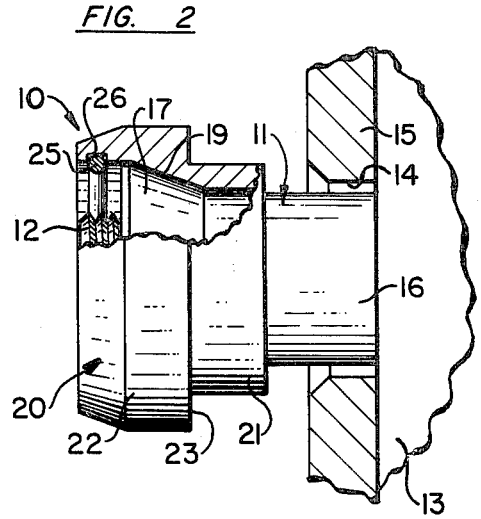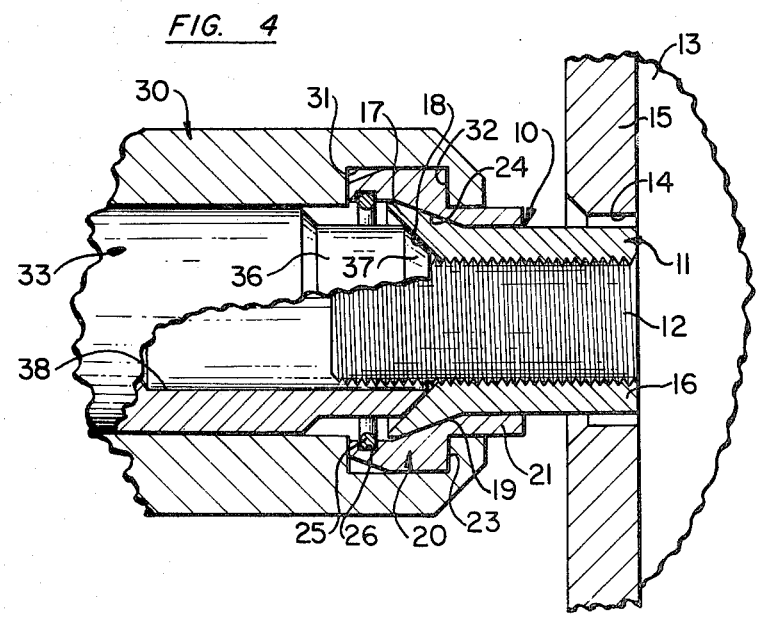

THEFT PREVENTION ASSEMBLY FOR USE WITH CAR WHEELS

The present invention relates to an improved theft prevention device for attachment to a wheel mounting stud and also relates to a special tool required for its attachment and removal.

Thefts of wheels from automobiles, trucks, tractors and the like have become a common problem. This is particularly true in the case of automobile dealers who frequently store large numbers of cars outdoors which are often unattended, particularly overnight.

Accordingly, it is a principal object of the invention to provide a device which can be secured to a wheel mounting stud to prevent removal of the wheel and which is designed so that it cannot be taken off except with a special tool also provided in accordance with the invention.

Another object of the invention is to provide such a combination which is of simple design and economical to fabricate and assemble, and yet sufficiently rugged so that it is not susceptible to breakage. Included in this object is the provision of such a combination which is easy and simple to use with a minimum of instruction.

Other objects will be in part obvious and in part pointed out in more detail hereinafter.

A better understanding of the invention will be obtained from the following description and the accompanying drawings of a preferred embodiment of the invention.

BRIEF DESCRIPTION OF THE DRAWINGS

FIG. 1 is a side view, partially in section showing a tool and theft prevention device embodying the invention, the device being engaged by the tool and being threadably mounted on an exemplary wheel mounting stud;

FIG. 2 is an enlarged side view, partially in section showing the theft prevention device mounted on a wheel mounting stud;

FIG. 3 is a fragmentary perspective view of the clamping end of the tool; and

FIG. 4 is an enlarged fragmentary cross-sectional view of the clamping end of the tool in engagement with the theft prevention device, the latter being threadably mounted on a wheel mounting stud.

DESCRIPTION OF THE PREFERRED EMBODIMENT

Referring to the drawings in detail, and particularly FIGS. 2 and 4, the theft prevention device 10 of my invention comprises an internally threaded sleeve 11 which is adapted to be threaded onto a convention wheel mounting stud such as the stud 12 secured at one end to the hub or brake housing 13 of a car axle and projecting outwardly through the opening 14 in the wheel 15. It will be appreciated that the usual car wheel mounting comprises several such threaded studs for receiving lug nuts to clamp the wheel to the hub. Ordinarily, only one lug nut will be removed and replaced by the theft prevention device of my invention. As shown, the sleeve 11 is internally threaded throughout its stem portion 16 which has a sufficiently small outer diameter so that when the sleeve is threaded to the full extent onto the stud 12 it will extend through the wheel opening 14 and bottom against the hub 13.

The outer end of the sleeve 11 is flared outwardly to form a radially and outwardly extending flange 17. The flange 17 is tapered so as to provide an inner frustoconical surface 18 and an outer frustoconical surface 19. Extending about and loosely encircling the flange 17 is a ring 20 having a shank 21 extending about the adjacent portion of the stem portion 16, and a main body portion 22 formed with a shoulder 23 and an internal frustoconical surface 24 complementary to the outer frustoconical surface 19 of the sleeve 11. To assemble the device, the ring 20 is merely slipped over the stem 16 to the seated position covering the flange 17 as shown in the drawing whereupon it is held in this position by means of a snap ring 25 placed in the internal groove 26.

As best shown in FIG. 2, the flange 17 and ring 20 are of greater diameter than the wheel hole 14 and thus when the theft prevention device 10 is threaded onto the wheel mounting stud 12, it is impossible to remove the wheel 15. Additionally, the ring 20 being loosely mounted on the sleeve 11 and freely rotatable thereon effectively prevents unauthorized removal of the device as it cannot be wrenched except with the special tool of my invention about to be described.

As shown in FIGS. 1, 3, and 4 of the drawing, the tool of my invention comprises an elongated tubular housing or body 30. The end of the tool for engaging the theft prevention device 10 has an internal groove 31 for receiving the head portion 22 of the ring 20 and an inwardly turned lip 32 for engaging against the shoulder 23. The end of the tool is partially cut away as shown to permit the device to be laterally inserted into the tool to the seated position shown in the drawing. Mounted for extension into the housing 30 is a shaft 33 externally threaded at 34 and threadably engaged with the internally threaded portion 35 of the housing. The inner end 36 of the shaft 33 is reduced in diameter and chamfered as indicated at 37. It also has an axial recess or bore as indicated at 38. The dimensions are such that when the shaft 33 is rotated to clamp the device 10, the chamfered edge 37 will engage the inner frustoconical surface 18 of the sleeve 11 and the bore 38 will accomodate the outer end of the stud 12 if it extends beyond the sleeve 11 as shown in FIG. 4.

When the theft prevention device 10 is seated in the tool with the lip 32 in engagement with the shoulder 23 and the shaft 33 is rotated to bring it into engagement with the end of the sleeve 11 as shown in FIG. 4, a powerful clamping force may be exerted to press the parts together to produce a high frictional force between the ring 20 and sleeve 11 and between them and the tool so that they will turn as a unit. By reason of the frustoconical surfaces 18, 19, and 24 and bevel 37, the amount of frictional surface is increased to a maximum and in addition a wedging action is produced which further enhances the gripping action. To facilitate turning of the shaft 33, its outer end is provided with a transverse handle 40, and a radial handle 41 is attached to the outer end of the housing 30 for turning the tool. Incidentally, it is preferred that the threaded portions 34, 35 be provided with a left-hand thread to minimize loosening of the tool when the device 10 is being turned.

As will be apparent from the above detailed description, when the user wishes to apply the theft prevention device 10 to a wheel stud, all he has to do is to seat the device in the end of the tool and turn the shaft 33 by means of handle 40 to clamp the device 10 within the tool. The device 10 can then be applied to the stud by turning the tool using the handle 41 until the device 10 bottoms against the hub 13. Thereupon the shaft 33 is retracted to release the theft prevention device and the tool may be removed. The theft prevention device cannot thereafter be removed to permit the wheel to be taken off except by reengaging it with the tool of my invention. Any ordinary tool applied to the ring 20 will be ineffective to turn the sleeve 11. By restricting the sales of the special tool to car dealers only, there is provided an effective means for deterring the theft of wheels from car lots and the like.

As will be apparent to persons skilled in the art, various modifications, adaptations and variations of the foregoing specific disclosure can be made without departing from the teachings of the present invention.

I claim:

1. The combination of a theft prevention device adapted to be mounted on a wheel mounting stud and a special tool required for its attachment and removal wherein:

A. the theft prevention device comprises:
        a. an internally threaded sleeve having a radially expanded end portion, which is flared outwardly to form inner and outer frustoconical surfaces,
        b. a ring loosely encircling said end portion and having a rear shoulder for engagement by the tool and an inner frustoconical surface complementary to and engageable with the outer frustoconical surface of the sleeve, and
    B. the tool comprises:
        a. an elongated tool body having relatively movable clamping members at one end for engagement behind the ring and with the end portion of the sleeve, and
        b. means for moving said clamping members together to produce sufficient frictional force to enable the sleeve, ring, and tool to be rotated as a unit.

2. The combination as defined in claim 1 wherein the tool body is tubular and the clamping members comprise a radially inwardly extending lip for engagement with the rear shoulder of the ring and a shaft extending axially through the opposite end of the body and threadably engaged therewith for axial movement upon turning of the shaft, the inner end of the shaft being dimensioned to engage the inner frustoconical surface of the end portion of the sleeve.

3. The combination as defined in claim 2 wherein the inner end of the shaft of the tool is beveled and has an axial bore.

4. A theft prevention device comprising a sleeve having a threaded stem and an expanded end portion which is flared providing an inner and an outer frustoconical surface, and a ring having a portion loosely encircling the expanded end portion and a shank loosely encircling the adjacent portion of the threaded stem, said ring having a radial shoulder facing toward the stem and an inner frustoconical surface complementary to the outer frustoconical surface of the sleeve engageable with the expanded end portion of the sleeve.

* * * * *